March 7, 1967  D. GLASER  3,307,274
TEACHING APPARATUS
Filed June 4, 1964  2 Sheets-Sheet 1
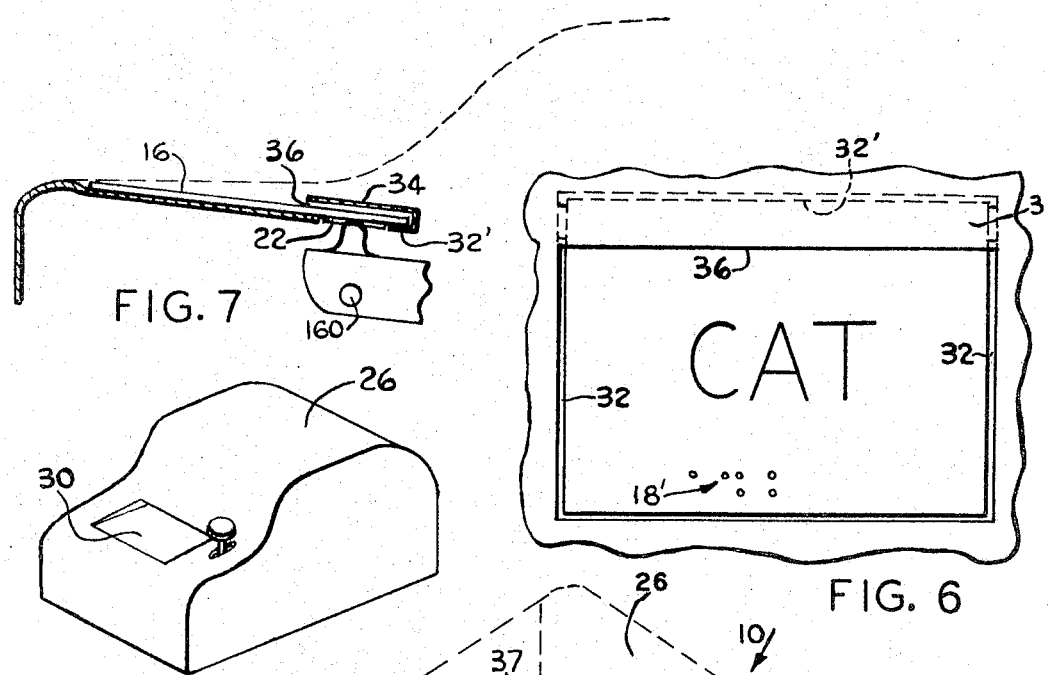
FIG. 7
FIG. 1
FIG. 6
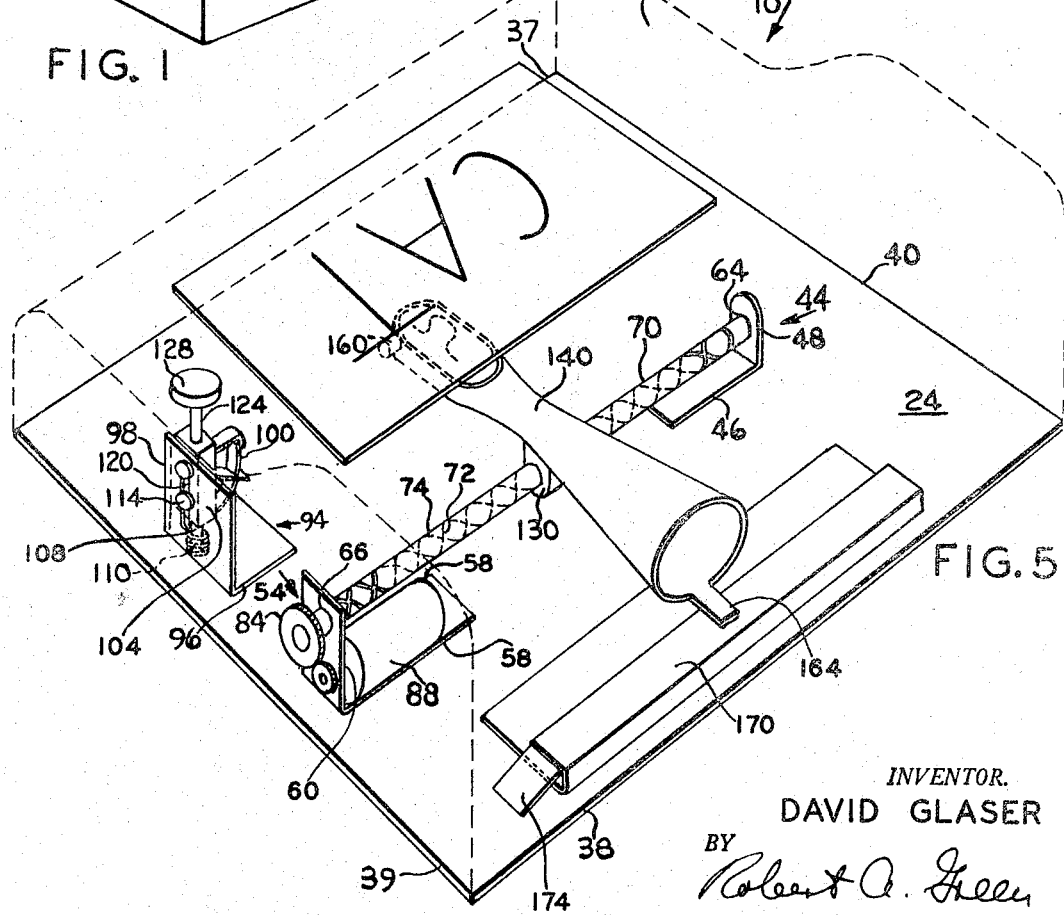
FIG. 5
INVENTOR.
DAVID GLASER
BY Robert A. Green
ATTORNEY March 7, 1967   D. GLASER   3,307,274
TEACHING APPARATUS
Filed June 4, 1964   2 Sheets-Sheet 2
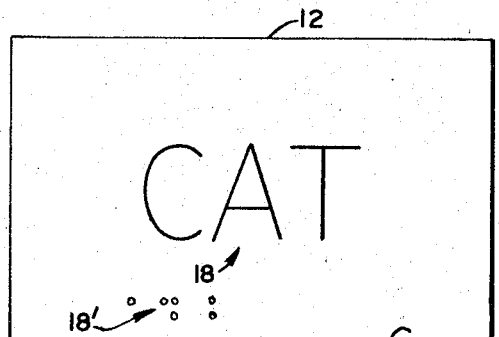
FIG. 2
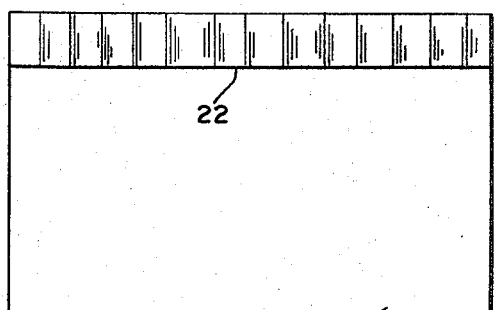
FIG. 3
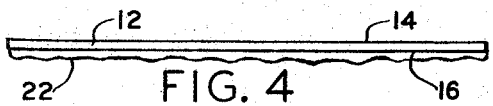
FIG. 4
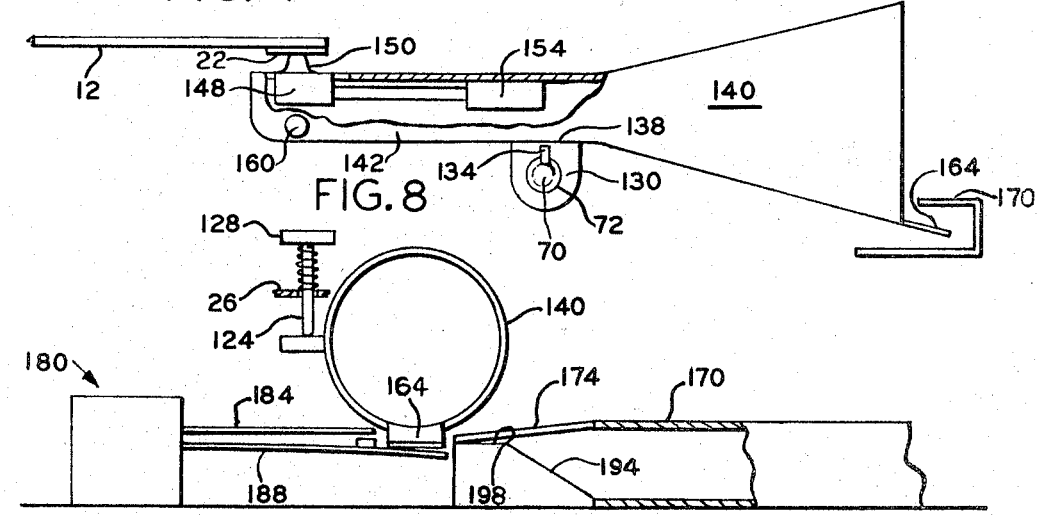
FIG. 8
FIG. 9
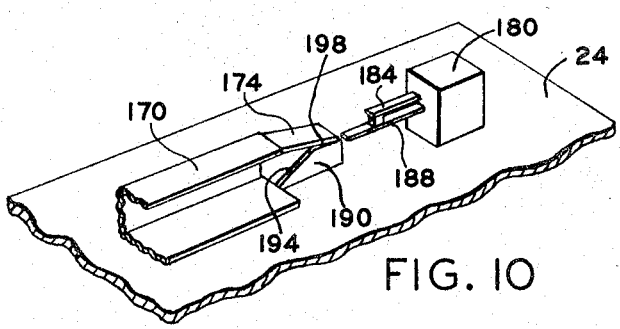
FIG. 10
INVENTOR.
DAVID GLASER
BY Robert A. Green
ATTORNEY

United States Patent Office 3,307,274
Patented Mar. 7, 1967

3,307,274
TEACHING APPARATUS
David Glaser, 256 Greenbrook Road,
Greenbrook, N.J. 08812
Filed June 4, 1964, Ser. No. 372,523
14 Claims. (Cl. 35—35)

This invention relates to teaching apparatus and, particularly, to teaching apparatus which includes a plurality of means for presenting a message to the user of the apparatus.

The prior art discloses a relatively small number of devices for teaching in which a plurality of message-presentation means are provided; and in these devices, visual means and audio means are employed for presenting a message to the user of the apparatus. These known devices are not completely satisfactory, particularly for use by children. For one thing, prior art devices generally require such a degree of participation or manipulation by the user that the attention of the user is distracted from the primary purpose of learning. In addition, in many cases, too little time is allowed between setting the apparatus into operation and the start of the teaching process. These problems are particularly important when the user of the apparatus is a very young child. Other types of devices which avoid these problems to a certain extent are too complex and are undesirably expensive for widespread commercial use.

Accordingly, the principles and objects of the present invention relate to the provision of an improved teaching machine which utilizes a plurality of message-presentation means and which is relatively simple in construction and operation.

Briefly, the apparatus of the invention includes a support means for a teaching card which carries a message in a plurality of forms, with each form of the message being positioned at a different location on the card. The message may be presented in usual form, in tactile form such as Braille, and in an audio form which can be transduced by the apparatus of the invention to provide an audio presentation of one of the other forms of the message. The apparatus includes transducing means which is adapted to be driven back and forth across the coded message to present the message in audible form at the same time that the message is perceived by other senses of the user, such as touch and sight. The audio presentation may be made as often as desired at the will of the user of the apparatus.

The invention is described in greater detail with reference to the drawing wherein:

FIG. 1 is a perspective view of apparatus embodying the invention;

FIG. 2 is a plan view of a message-carrying card usable with the apparatus of FIG. 1;

FIG. 3 is a plan view of the opposite surface of the card shown in FIG. 2;

FIG. 4 is a side elevational view of the card of FIG. 2;

FIG. 5 is a perspective view of the operating mechanism employed in the apparatus of the invention shown in FIG. 1;

FIG. 6 is an enlarged view of a portion of the apparatus of FIG. 1;

FIG. 7 is a side elevational view, partly in section, of a portion of the apparatus shown in FIG. 6;

FIG. 8 is a side elevational view, partly in section, of a portion of the apparatus shown in FIG. 5;

FIG. 9 is a rear view of a portion of a modification of the invention; and

FIG. 10 is a perspective view of a portion of the apparatus shown in FIG. 9.

A teaching machine 10 embodying the invention is adapted to be utilized with an information-carrying card 12 (FIGS. 2, 3, 4) which has upper and lower surfaces 14 and 16, respectively. The upper surface of the card, which is accessible to the user of the machine 10, carries a message in a plurality of forms, each of which is adapted to be perceived by one of the senses of the user. For example, the message 18 is in usable form, to appeal to the sense of sight, and the message 18' is in a form such as Braille, which appeals to the sense of touch of the user. The messages 18 and 18' may comprise a single letter of the alphabet, a word, a phrase, a paragraph, or the like. The lower surface 16 of the card 12 carries the same message in a coded form 22 which can be converted by the apparatus of the invention to an audible presentation of the visual message 18 or the tactile message 18'.

The coded audio form 22 of the recorded message may be of a groove type such as is used in conventional phonograph records, or it may be a type known as "hill and dale" recording, or it may be a magnetically recorded message, or it may be an optically recorded message of the type use on sound film. For purposes of the following description, it is assumed that the message is recorded in hill and dale form, for example, directly on the card or on a strip of plastic material which is secured to and extends across the width of the card. The audio record area or strip 22 is preferably oriented adjacent and parallel to one of the long edges of the card.

The teaching machine 10 includes a support base 24, on which the various components of the machine are mounted, and a cover 26 which may serve both decorative and functional purposes. Referring to FIGS. 1, 6, and 7, the cover 26 is provided with a rectangular opening 30 which is adapted to receive the information card 12 with the visual or tactile information 18, 18' facing up and the recorded audio information 22 facing down. The opening 30 is defined by a continuous ledge 32 on which the card 12 is seated. The rear edge 32' of this ledge is positioned rearwardly of portion 34 of the cover 26 to form a channel 36 between the cover and the ledge portion 32', this channel serving to hold the card 12 securely in place. The coded message 22 on the rear surface of the card is thus positioned at the portion of the card which is held in the channel 36 and lies parallel to the channel. The ledge 32 and channel 36 are shaped so that the card receiving surfaces and the card slant downwardly from the front toward the rear of the cover as seen in FIG. 7.

The support base 24 is generally in the form of a flat plate which has a front edge 37, a rear edge 38, and side edges 39 and 40. A first L-shaped bracket 44, which includes a horizontal arm 46 and a vertical arm 48, is mounted adjacent to the side edge 40 about midway between the front and rear edges 37 and 38, respectively.

A second L-shaped bracket 54 which includes a horizontal arm 58 and a vertical arm 60 is mounted adjacent to the side edge 39 in alignment with the first bracket 44. The brackets 44 and 54 include apertures 64 and 66 formed in their vertical arms and aligned with each other to serve as bearings for a screw member or rotatable shaft 70 which is rotatably and horizontally mounted therein.

The shaft 70 is provided with two helical tracks 72 and 74, one a left-hand track and one a right-hand track, and, at each end of the shaft, the tracks communicate with each other so that a body which rides along one track to one end of the shaft automatically enters the other track and follows this track to the opposite end where it automatically enters the one track and rides again to the other end. At one end, the shaft 70 carries a pulley or gear 84 or the like which is operatively coupled to a motor 88 which is used to drive and rotate the shaft 70. The motor 88 may be operated by battery or other suitable power source (not shown).

Adjacent to motor 88 and mounted on base 24 is another

L-shaped bracket 94 which includes a horizontal arm 96 and a vertical arm 98 which carries a vertically slidable switch 100. The switch is preferably of the leaf-spring type and is carried by a housing 104 which is vertically slidably mounted on a post 108 and is biased upwardly by a spring 110 carried by the post between the housing 104 and the horizontal arm 96 of bracket 94. The spring housing 104 carries a stud 114 which rides in a slot 120 in the vertical arm 98 of bracket 94. A vertically extending push rod 124 is attached to the spring housing 104 and extends through the cover 26, where a push button 128 is provided at the upper end of the push rod. The push button 128 is used for pushing the housing 104 and the spring 110 downwardly to operate the machine 10, in a manner to be described. The bias spring 110 urges the housing 104 and switch 100 upwardly when downward pressure on the push button 128 is removed. The switch 100 is adapted to control the operation of the motor 88.

Referring to FIGS. 5 and 8, a transducer carrier comprising an annular metal sleeve 130 is mounted on the screw member or shaft 70. The sleeve 130 is provided with a pin 134 or the like which engages and rides in one of the tracks 72, 74 at a time, whereby the carrier 130 moves along the shaft 70 in one direction or the other. The carrier 130 includes a flat horizontal top surface 138 on which is secured a transducer housing 140 which is thus adapted to travel back and forth along the shaft 70 with the carrier 130.

The transducer housing 140 is generally tubular in form and is oriented generally transverse to the shaft 70. The housing 140 is weighted so that it tends to rotate clockwise about shaft 70 as seen in FIG. 8. At one end 142, the transducer housing carries means for converting the recorded audio information 22 on the lower surface of the card 12 to audible information. This audio conversion means may comprise a crystal or magnetic cartridge 148 having an operating stylus 150 which is adapted to engage and traverse the audio message on the lower surface of the card. The cartridge 148 is electrically connected to a loudspeaker 154 which is mounted in another portion of the housing, rearwardly of the cartridge 148. If desired, a simple acoustical transducer may be used to obtain the audio message.

The front end 142 of the housing 140 is provided with a button 160 which is positioned at the side of the housing so that it can contact and manipulate the switch 100 when the transducer housing 140 it at this end of the shaft 70. At the opposite or rear end of the transducer housing 140, there is provided a lip 164 which is adapted to operate in conjunction with a guide plate 170. A small wheel may be used in place of lip 164, if desired.

The guide plate 170 is oriented horizontally and parallel to the base plate 24 and it extends adjacent to and along the rear edge 38 of base plate 24. The guide plate 170 is suitably secured to the base plate 24, but it is elevated above the base plate in any suitable fashion. The flat guide plate 170 is oriented so that it parallels the path of the audio recorded message and the path of travel of the shaft 70. The transducer housing as it travels along the shaft is guided by the relationship between the lip 164 and the guide plate 170. This will be described in greated detail below.

The guide plate extends across a considerable portion of the width of the base plate 24 and carries at its end adjacent to side edge 39, a flexible plate or tab 174 which may be made of plastic, thin spring metal or the like. The flexible plate is adapted to have the lip 164 of the housing 140 ride up its surface and onto the top surface of the guide plate 170. The flexible plate 174 may be held in place in any suitable fashion, for example by welding, or the end of the guide plate may be shaped to hold the plate mechanically by means of a channel or crimped portion, or the like (not shown in detail).

In considering the operation of the apparatus of the invention, let it be assumed that, initially, the carrier 130 and transducer housing 140 are positioned at the left-hand end of the shaft 70 (as seen in FIG. 5), with the switch-operating button 160 bearing against and holding open the switch 100 so that the motor 88 is not energized and the shaft 70 is not rotating. A card 12 to be studied is inserted in the opening 30 in the cover 26 of the machine 10, and the push button 128 is pushed downwardly to drive spring housing 104 downwardly and thus free the switch 100 from the pressure of button 160. Thus freed, the switch closes and energizes motor 88. As the motor 88 runs, the shaft 70 turns and drives the transducer housing 140 to the right. As the transducer housing starts its travel along the shaft, the lip 164 of the housing rides up the flexible plate 174 onto the flat guide plate 170. As the lip rides up the flexible plate, the transducer housing is rotated about the shaft 70 as an axis and the stylus 150 is moved away from the recorded message 22 on the card 12. When the transducer housing reaches the opposite end of the shaft, the lip 164 falls off the plate 170, and the weight distribution of the housing 140 is such that the housing 140 rotates clockwise about shaft 70, as seen in FIG. 5. Thus, the lip 164 falls below the guide plate 170, and the stylus comes into contact with the recorded audio message on the lower surface of the card. The message starts at this end of the card. As the shaft 70 continues to turn, the transducer housing 140 now moves to the left, and as it moves with the lip 164 beneath the guide plate 170 and with the stylus in contact with the recorded message, the recorded message becomes audible to the user of the apparatus.

When the transducer housing again reaches the left-hand end of shaft 70, button 160 touches and opens the switch 100 and the motor stops turning. Another cycle of operation may be performed by again pushing down on the push button 128 to open switch 100.

A modification of the switch portion of the invention is shown in FIGS. 9 and 10. This embodiment of the invention utilizes a switch 180 which includes two leaf-spring contact members 184 and 188 which are oriented horizontally with one above the other, with the lower spring member 188 being longer than the upper. The spring is positioned adjacent to the flexible plate 174 which is carried by the flat guide plate 170. In addition, a ramp member 190 is secured to the base 24, beneath the flexible plate 174 and adjacent to the switch 180. The ramp member includes a sloping surface 194 which rises from the base 24 and a generally flat and horizontal top surface 198 into which the sloping surface merges. The top surface 198 of the ramp member 190 is positioned adjacent to and at substantially the same horizontal level as the lower leaf-spring member. The flexible plate 174 extends too close to the lower spring member and may rest on the top surface of the ramp member.

In this modification of the invention, the push rod 124 with its push button 128 is positioned so that it operates direcly on the button 160 provided at the side of transducer housing 140.

In operation of this embodiment of the invention, let it be assumed that the recorded message is being played and the transducer housing 140 is traveling along shaft 70 toward the switch with lip 164 beneath plate 170. When the housing 140 reaches the end of its path of travel, the tab 164 rides up the sloping surface of the ramp member to the top surface and then along the top surface. Finally, the lip 164 leaves the top surface of the ramp member and falls onto the lower spring member of the switch. The weight of the transducer housing resting on the lower spring member causes the switch to open and to turn off the motor 88. For the next cycle of operation of the apparatus, the user of the apparatus presses down on the push button 128 and causes the transducer housing to rotate counter-clockwise about the shaft 70, as seen in FIG. 5, whereby the tab 164 is raised above the lower leaf-spring, and the switch closes. The motor 88 is energized and causes the shaft 70 to rotate. The rotation of the shaft causes the transducer housing 140 to move to the right, with the tab 164 riding along the surface of the flexible plate 174 and onto the top surface of the plate 170 whereby the stylus is held out of engagement with the recorded message. When the transducer housing reaches the opposite end of the plate, as described above, the tab drops off the top surface of the plate 170 and the transducer housing rotates to bring the stylus into contact with the recorded message, and, as the transducer housing now moves to the left, the recorded message is heard.

Those skilled in the art will appreciate that many modifications may be made in the specific apparatus described and within the scope of the invention. For example, the audio message may be recorded on magnetic tape and the transducer may include the usual magnetic tape reading apparatus. In addition, in still another modification of the invention, the audio recording might be of the electrooptical type, in which case, a light source would be provided to scan the message area and suitable photocell apparatus would be provided to receive reflected light and convert it to an audible message.

The apparatus of the invention has many advantages, the primary advantages being that it is inexpensive, simple in construction, and simple in operation. In addition, it is extremely flexible in that a message can be perceived by several senses of the user, and, since a blind person can read the message by combining his senses of touch and hearing, his opportunities for learning are considerably increased.

What is claimed is:

1. Teaching apparatus including
  a message-carrier which carries a message in a plurality of different forms,
  a message-reader mounted in operative relation with said message-carrier,
  drive means coupled to said message-reader for driving said reader along first and second paths of travel back and forth adjacent to said message-carrier, and
  auxiliary means adjacent to said message-reader and in operative relation with a portion thereof for (1) holding said message-reader out of reading contact with said message-carrier and unable to read a message on said first path of travel and (2) holding said message-reader in reading contact with said message-carrier and able to read a message on said second path of travel.

2. The apparatus defined in claim 1 wherein said auxiliary means comprises a track on which said message-reader rides on said first path of travel whereby said message-reader is held out of reading contact with said message-carrier, said message-reader being disconnected from said track on said second path of travel whereby said message-reader is in reading contact with said message-carrier.

3. Teaching apparatus including
  a message-carrier carrying a single message in a plurality of forms and oriented substantially in a horizontal plane,
  a message-reader mounted in operative relation with said message-carrier,
  said message-reader being mounted so that it is rotatable about a horizontal axis,
  drive means coupled to said message-reader for driving it along first and second paths of travel back and forth horizontally adjacent to said message-carrier and along said horizontal axis, and
  auxiliary means mounted in operative relation with said message-reader for controlling the reading operation performed thereby,
  said auxiliary means holding said message-reader out of reading contact with said message-carrier on said first path of travel, said auxiliary means rotating said message-reader about said axis into message-reading contact with said message-carrier on said second path of travel.

4. Teaching apparatus including
  a message-carrier carrying a single message in a plurality of forms and oriented substantially in a horizontal plane,
  a message-reader mounted in operative relation with said message-carrier,
  said message-reader being mounted so that it is rotatable about a horizontal axis,
  drive means coupled to said message-reader for driving it along first and second paths of travel back and forth horizontally adjacent to said message-carrier and along said horizontal axis, and
  auxiliary means mounted in operative relation with said message-reader for controlling the reading operation performed thereby, said auxiliary means comprising a track on which said message-reader rides on said first path of travel whereby said message-reader is held out of reading contact with said message-carrier, said message-reader being disconnected from said track on said second path of travel whereby said message-reader is in reading contact with said message-carrier,
  said auxiliary means holding said message-reader out of reading contact with said message-carrier on said first path of travel, said auxiliary means rotating said message-reader about said axis into message-reading contact with said message-carrier on said second path of travel.

5. The apparatus defined in claim 4 and including electrical switch means mounted adjacent to said auxiliary means and operated by the user of said apparatus and by said message-reader to turn the apparatus on and off.

6. The apparatus defined in claim 4 and including electrical switch means mounted adjacent to said auxiliary means,
  mechanical operating means coupled to said switch means, and
  auxiliary means mounted on said message-reader for changing the state of said switch means.

7. The apparatus defined in claim 4 and including an electrical switch mounted adjacent to said auxiliary means,
  a push button operator coupled to said switch and adapted to operate the switch and turn the apparatus on and to initiate a message-reading cycle, and
  means mounted on said message-reader adapted to contact said switch and turn the apparatus off at the end of a message-reading cycle.

8. The apparatus defined in claim 4 wherein
  said auxiliary means includes a horizontal plate oriented parallel to the path of travel of said message-reader,
  said message-reader including a portion adapted (1) to engage said plate on one of its paths of travel and (2) to be disengaged from said plate on the other of its paths of travel.

9. The apparatus defined in claim 4 wherein
  said message-reader includes a housing, and
  said auxiliary means includes a horizontal plate oriented parallel to the path of travel of said message-reader,
  the housing of said message-reader including a portion adapted (1) to engage said plate on said first path of travel on which a message-reading operation is not performed and (2) to be disengaged from said plate on said second path of travel on which a message-reading operation is performed.

10. The apparatus defined in claim 4 wherein
  said message-carrier includes a housing, and
  said auxiliary means includes a horizontal plate oriented parallel to the path of travel of said message-reader,
  a tab being flexibly coupled to said plate at one end thereof and positioned as a ramp thereto,
  the housing of said message-reader including a portion adapted to move up the ramp formed by said tab and onto said horizontal plate at the beginning of a cycle of operation of the apparatus, this movement causing said message-reader to rotate in a first direction about said horizontal axis and thus to move said message-reader out of message-reading relation with said message-carrier, said portion of said housing being disengaged from said horizontal plate at the end of said first path of travel, this disengagement causing said message-carrier to rotate in a direction opposite to said first direction whereby said message-reader moves into message-reading relationship with respect to said message-carrier, this relationship being maintained and a message being read through said second path of travel of said message-reader.

11. Teaching apparatus comprising
a support base,
a message-carrier oriented in a substantially horizontal plane above said support base,
a housing carrying a message-reader rotatably mounted on a horizontal axis,
said housing being oriented so that, as it is rotated, said message-reader is moved into and out of operative relation with a message carried by said message-carrier,
drive means coupled to said housing for driving said housing along first and second paths of travel parallel to said message-carrier,
a guide track for said housing mounted on said support plate,
said housing including a portion adapted to engage and ride on said track on said first path of travel, said portion being adapted to be disengaged from said track on said second path of travel,
means coupled to said track for causing said portion of said housing to engage said track when said housing begins its movement along said first path of travel, and
switch means mounted on said support plate for controlling the operation of said drive means,
said housing being adapted to operate said switch means at the end of a message-reading cycle to de-energize said drive means.

12. The apparatus defined in claim 11 wherein said switch means is positioned adjacent to said track and means are provided adjacent to said switch and at the end of the second path of travel of said housing for bringing said portion of said housing into contact with said switch whereby said switch is opened and said drive means is de-energized.

13. Teaching apparatus comprising
a relatively rigid sheet carrying a visible printed message at one portion of its surface and an audio recording of the same message at another portion of its surface,
a transducer in operative relation with said audio recording for rendering said recording audible,
support means removably supporting said sheet with said visible message facing the user of the apparatus and with said audio recording in operative relation with said transducer, and
drive means coupled to said transducer for causing said transducer to render audible said recorded message, said drive means being operable one or more times at the will of the user to repeat the audio message while the sheet is in place on said support means,
said drive means including apparatus for driving said transducer over a fixed path of travel with respect to said sheet, said drive means also including auxiliary means for bringing said transducer into contact with said audio recording over a portion of said path whereby said recording is rendered audible, said auxiliary means moving said transducer out of contact with said audio recording over another portion of said path.

14. Teaching apparatus including
a message-carrier which carries a message in a plurality of different forms including a printed visual form and an audio recorded form,
a message-reader mounted in operative relation with said message-carrier for rendering audible said audio recorded form of a message,
drive means coupled to said message-reader for driving said reader along first and second paths of travel adjacent to said message-carrier, and
auxiliary means adjacent to said message-reader and in operative relation with a portion thereof for (1) holding said message-reader out of reading contact with said message-carrier and unable to read a message on said first path of travel and (2) holding said message-reader in reading contact with said message-carrier and able to read a message on said second path of travel.

References Cited by the Examiner

UNITED STATES PATENTS

| | | | |
|---|---|---|---|
| 2,371,325 | 3/1945 | Wessborg | 35—35.1 |
| 2,849,542 | 8/1958 | MacChesney | 35—35.3 X |
| 2,936,342 | 5/1960 | Kallmann | 35—35.3 X |
| 3,078,593 | 2/1963 | Miller | 35—35.3 X |

EUGENE R. CAPOZIO, *Primary Examiner.*

W. GRIEB, *Assistant Examiner.*